(12) United States Patent
Chang et al.

(10) Patent No.: US 8,552,743 B2
(45) Date of Patent: Oct. 8, 2013

(54) MICROWAVE DIFFRACTION SYSTEM

(75) Inventors: Tsun-Hsu Chang, Hsinchu (TW); Ching-Pin Yuan, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 554 days.

(21) Appl. No.: 12/909,326

(22) Filed: Oct. 21, 2010

(65) Prior Publication Data
US 2012/0049862 A1 Mar. 1, 2012

(30) Foreign Application Priority Data
Aug. 24, 2010 (TW) .............................. 99128235 A

(51) Int. Cl.
*G01R 27/04* (2006.01)
*G01R 27/32* (2006.01)

(52) U.S. Cl.
USPC ........... 324/642; 343/753; 343/754; 343/909; 333/239; 333/248

(58) Field of Classification Search
USPC ........................................................ 324/642
See application file for complete search history.

(56) References Cited

U.S. PATENT DOCUMENTS

| | | | | |
|---|---|---|---|---|
| 3,775,694 | A * | 11/1973 | Quine | 330/56 |
| 6,185,441 | B1 * | 2/2001 | Wikborg et al. | 505/210 |
| 6,463,308 | B1 * | 10/2002 | Wikborg et al. | 505/210 |
| 6,529,089 | B2 * | 3/2003 | Yuanzhu | 333/21 A |
| 6,801,107 | B2 * | 10/2004 | Chen et al. | 333/234 |
| 7,561,013 | B2 * | 7/2009 | Yoneyama et al. | 333/249 |
| 7,705,694 | B2 * | 4/2010 | Craig et al. | 333/202 |
| 2006/0103489 | A1 * | 5/2006 | Johansson et al. | 333/157 |
| 2012/0025928 | A1 * | 2/2012 | Crouch | 333/125 |

OTHER PUBLICATIONS

Cornick, M.T, and Field, S.B., "Microwave Bragg diffraction in a model crystal lattice for the undergraduate laboratory", American Journal of Physics, vol. 72, No. 2, Feb. 2004, pp. 154-158.*
Amato, Joseph C., and Williams, Roger E., "Rotating crystal microwave Bragg diffraction apparatus", American Journal of Physics, vol. 77, No. 10, Oct. 2009, pp. 942-945.*
Fernandez-Prieto, A., Medina, F., and Mesa, F., "Microstrip circuit analog of a complex diffraction phenomenon", Appl. Phys. Lett. 95, 021108 (2009) Published online Jul. 14, 2009.*
Tipa, R.S., and Baltag, O. I., "Study on a Model of Bragg Diffraction Using Microwaves", Rom. Journ. Phys., vol. 53, Nos. 1-2, pp. 249-251, Bucharest, 2008.*

(Continued)

*Primary Examiner* — Melissa Koval
*Assistant Examiner* — Benjamin M Baldridge
(74) *Attorney, Agent, or Firm* — Muncy, Geissler, Olds & Lowe, PLLC

(57) ABSTRACT

A microwave diffraction system includes two plates, a lattice model, a transmitter and a detector. The two plates are electrically conductive and configured in a parallel manner so as to form a planar waveguide. The lattice model includes a plurality of cylinders arranged in regular order and is placed between the two plates. The transmitter is arranged at an outside edge of the planar waveguide and configured for providing a microwave towards the lattice model. The detector is arranged at outside edge of the planar waveguide and configured for detecting the microwave reflected from the lattice model. The diffraction pattern obtained by the above-mentioned microwave diffraction system is similar to theoretical value.

19 Claims, 6 Drawing Sheets

(56) References Cited

OTHER PUBLICATIONS

Preston, Daryl W., and Dietz, Eric R., "The Art of Experimental Physics", Publication Date Jan. 16, 1991, Chapter 10, pp. 180-197.*

Murray, William Henry, "Microwave Diffraction Techniques from Macroscopic Crystal Models", Am. J. Phys. 42, 137 (1974), pp. 137-140.*

* cited by examiner

MICROWAVE DIFFRACTION SYSTEM

BACKGROUND OF THE INVENTION

1. Field of the Invention

The present invention relates to a diffraction system, more particularly to a microwave diffraction system simulating Bragg diffraction by using microwave.

2. Description of the Prior Art

Bragg diffraction has been applied to x-ray crystallography to determine the arrangement of atoms within a crystal. For instruction purpose, x-ray, electron or neutron diffraction are not only expensive but also hazardous to health in the case of long-term exposure to x-ray. In addition, the atoms in the crystal lattice are invisible to the eyes and thus not convincing for instruction purpose.

Applying microwave radiation to metal cylinders simulating crystal lattices may solve the above-mentioned problems at a lower cost. However, conventional microwave diffraction systems have disadvantages in larger size (about 1-2 meters) and deviation from theoretical value of the experimentally obtained diffraction angle.

To sum up, it is now a current goal to provide a microwave diffraction system having smaller size and presenting diffraction pattern approximate to the theoretical value.

SUMMARY OF THE INVENTION

The present invention is directed to a microwave diffraction system which presents diffraction pattern similar to theoretical value.

According to one embodiment, a microwave diffraction system includes two plates, a lattice model, a transmitter and a detector. The two plates are electrically conductive and configured in a parallel manner so as to form a planar waveguide. The lattice model includes a plurality of cylinders arranged in regular order and is placed between the two plates. The transmitter is arranged at outside edge of the planar waveguide and configured for providing a microwave towards the lattice model. The detector is arranged at outside edge of the planar waveguide and configured for detecting the microwave reflected from the lattice model.

Other advantages of the present invention will become apparent from the following descriptions taken in conjunction with the accompanying drawings wherein certain embodiments of the present invention are set forth by way of illustration and examples.

BRIEF DESCRIPTION OF THE DRAWINGS

The foregoing aspects and many of the accompanying advantages of this invention will become more readily appreciated as the same becomes better understood by reference to the following detailed descriptions, when taken in conjunction with the accompanying drawings, wherein.

DESCRIPTION OF THE PREFERRED EMBODIMENT

Figure 1:
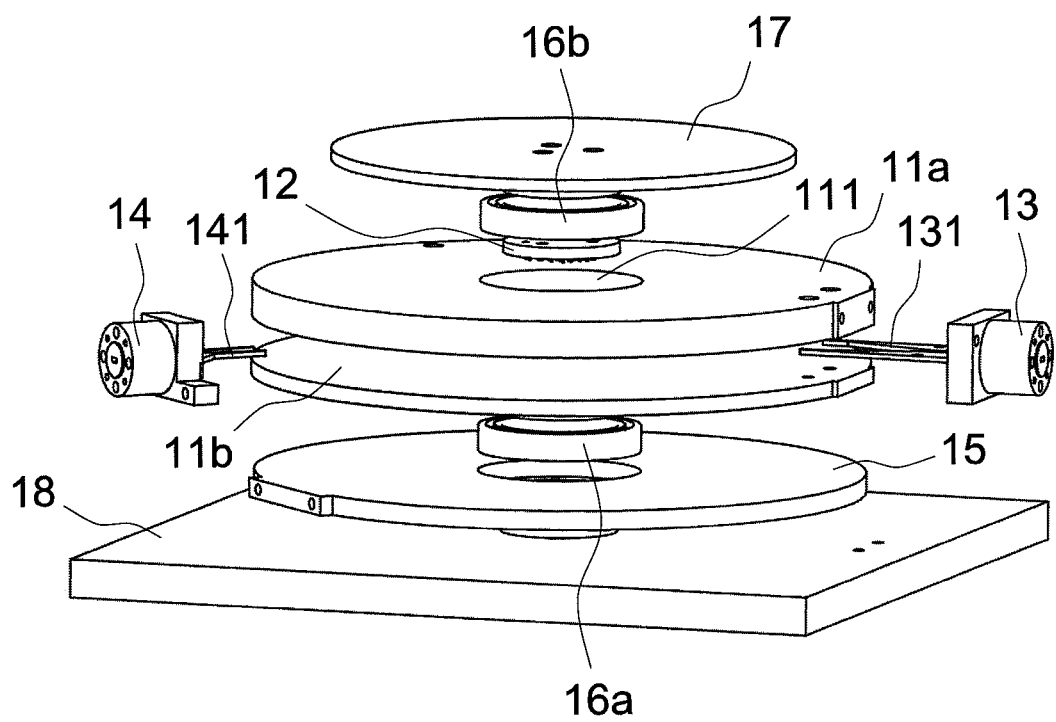
FIG. 1 is an exploded diagram illustrating a microwave diffraction system according to one embodiment of the present invention.
Figure 2:
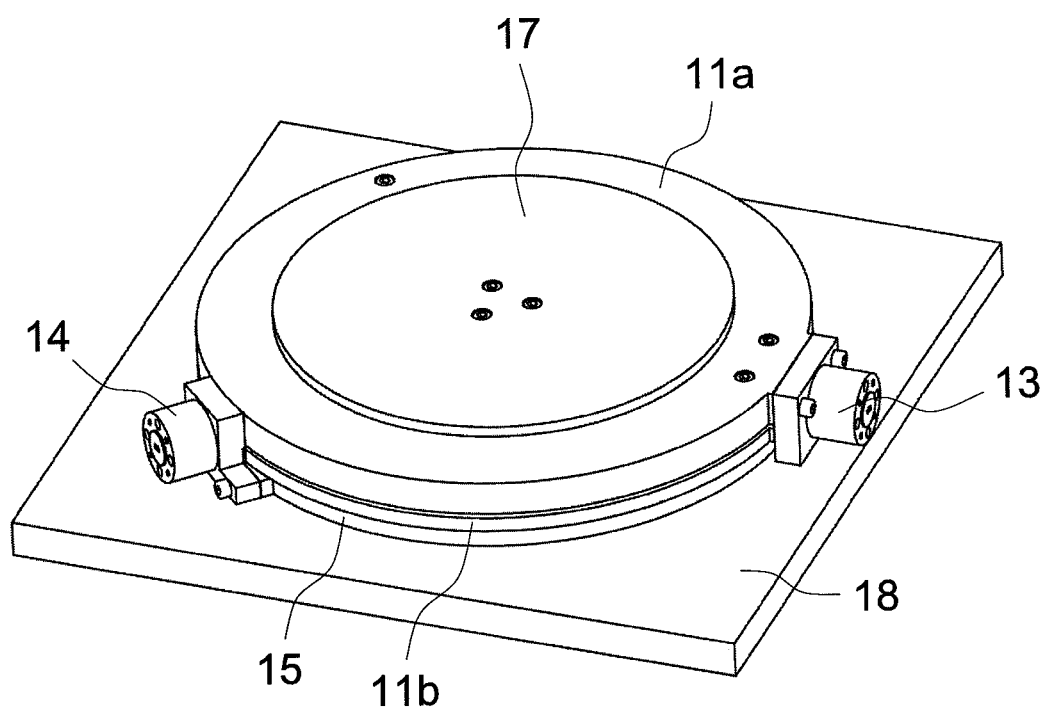
FIG. 2 is an assembly diagram illustrating a microwave diffraction system according to one embodiment of the present invention.
Figure 3A:
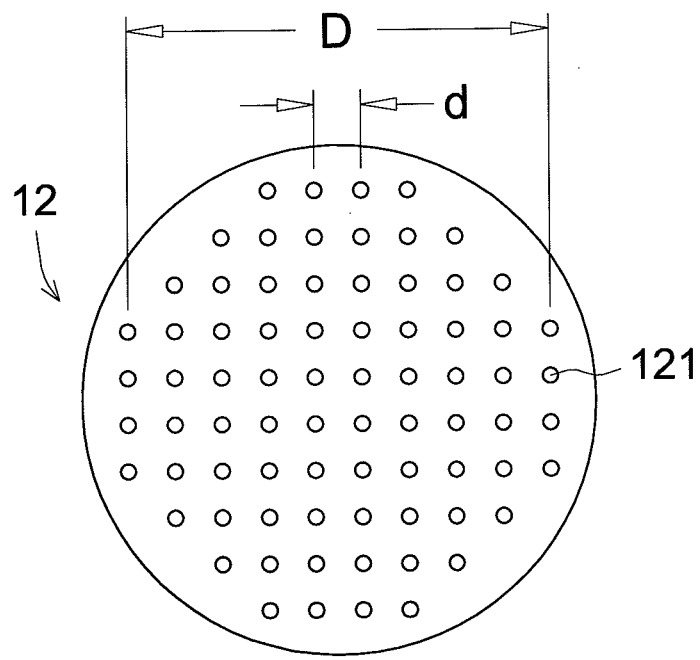
FIG. 3a is a top-view diagram illustrating a lattice model of a microwave diffraction system according to one embodiment of the present invention.
Figure 3B:
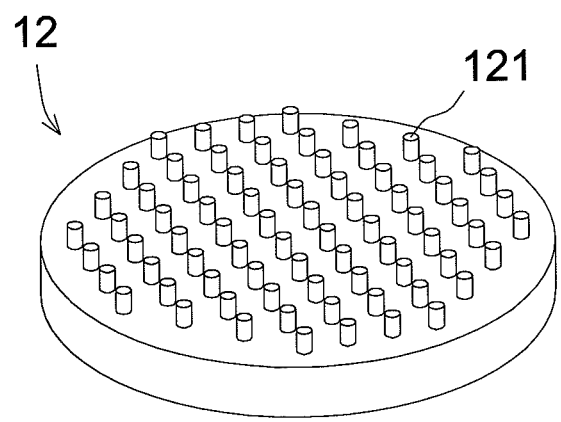
FIG. 3b is a 3D view diagram illustrating a lattice model of a microwave diffraction system according to one embodiment of the present invention.
Figure 4:
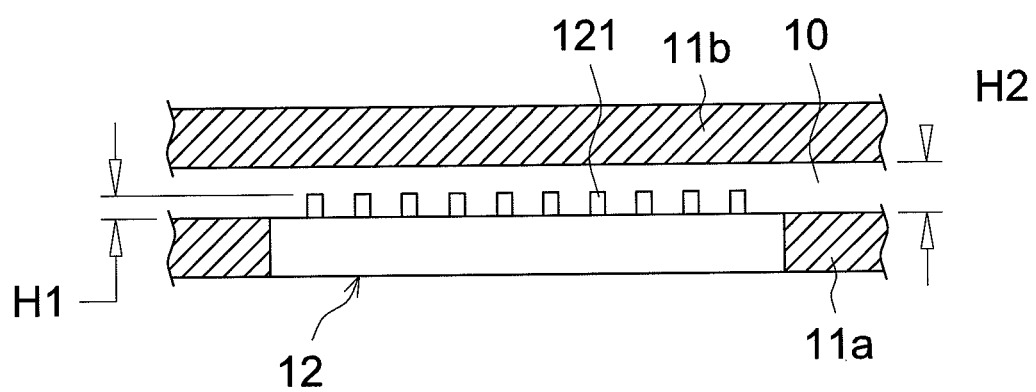
FIG. 4 is a sectional view diagram illustrating the relative position of the lattice model and the planar waveguide of a microwave diffraction system according to one embodiment of the present invention.

Referring to FIGS. 1 to 4, a microwave diffraction system according to one embodiment of the present invention includes two plates 11a, 11b, a lattice model 12, a transmitter 13 and a detector 14. The conductor plates 11a, 11b are electrically conductive and configured in a parallel manner so as to form a planar waveguide 10. The lattice model 12 includes a plurality of cylinders 121 arranged in regular order. The cylinders 121 of lattice model 12, with proper arrangement, may be placed between the plates 11a, 11b. For example, the cylinders 121 may be arranged on a substrate placed within openings 111 of the plate 11a so as to form cylinders 121 protruding in the planar waveguide 10, as illustrated in FIG. 4. This means the cylinders 121 simulating atoms in the lattice structure are configured within the planar waveguide 10. It is noted that the cylinders 121 may also be configured at the inner surface of the plate 11a or 11b. In one embodiment, the radius of the cylinders 121 is less than or equal to $\lambda/2\pi$, where $\lambda$ represents the wavelength of incident microwave to the lattice model 12.

Following the above description, the transmitter 13 (illustrated with its front-end structure only) is arranged at an outside edge of the planar waveguide 10 and configured for providing microwave to the lattice model 12. In one embodiment, the electric field of the incident microwave to the lattice model 12 is orthogonal to the plates. For example, the incident microwave may be a TEM mode wave. The detector 14 (illustrated with its front-end structure only) is also arranged at the outside edge of the planar waveguide 10 and configured for detecting the microwave reflected from the lattice model 12. For example, the detector 14 may be used for transforming the wave energy into a voltage signal.

In one embodiment, the transmitter 13 includes a first mode converter 131 which is arranged between the plates 11a, 11b and connected to the transmitter 13 with one of its ends. The first mode converter 131 is horn-shaped; this means the connecting end of the first mode converter 131 has a smaller inner radius than that of its opening end. The first mode converter 131 may convert the first mode wave into a second mode wave, which is then incident to the lattice model 12. For example, the $TE_{10}$ mode wave provided by the microwave source may be converted to TEM mode wave by the first mode converter 131. In one embodiment, the opening end of the first mode converter 131 is substantially as wide as or approximately wider than the lattice model 12 so as to achieve full coverage of the lattice model 12 with concentrated incident microwave.

In one embodiment, the detector 14 includes a second mode converter 141 arranged between the plates 11a, 11b and connected to the detector 14 with one of its ends. The second mode converter 141 is also horn-shaped; this means the connecting end of the second mode converter 141 has a smaller inner radius than that of its opening end. It is noted that the opening end of the second mode converter 141 is smaller in width than that of the opening end of the first mode converter 131 for accurate detection of microwave reflection angle.

In one embodiment, the detector 14 is connected to a rotor 15, for example with a bearing 16a configured at the junction of the rotor 15 and the plate 11b, so that the detector 14 may be rotated along the lattice model 12 as a central axis, collect and convert microwave of various reflection angles into the electrical signal.

In one embodiment, the microwave diffraction system includes a carrier 17 configured for carrying the lattice model 12. The cylinders 121 of the lattice model 12 protrude into the planar waveguide 11 through the opening 111 of the plate 11a. Therefore, different lattice models 12 having various lattice structures may be replaced with each other in this configuration by loading and unloading the carrier 17. Preferably, the transmitter 13 is connected to the plate 11a having the opening 111 and the carrier 17 may be rotated against the plate 11a, for example, through a bearing 16b configured at the junction of the carrier 17 and the plate 11a. Therefore, the incident angle of microwave to the lattice model 12 may be adjusted by controlling the relative rotation of the transmitter 13 to the carrier 17. In one embodiment, the above-mentioned elements may be mounted on a base 18 and the plate 11a or the base 18 is provided with angle calibration for an operator to observe the rotating angle of the lattice model 12 and detector 14.

Diffraction exists where $2d \sin \theta = n\lambda$, wherein d represents pitch among the cylinders 121 of the lattice model 12 (as illustrated in FIG. 3a), and $\lambda$, represents the microwave wavelength. Therefore, shortened microwave wavelength would result in reduced size of the lattice model 12. In one embodiment, the distance between the detector 14 and the lattice model 12 is about $D^2/2\lambda$, wherein D represents the width of the lattice model 12, as illustrated in FIG. 3a. In one embodiment, the width D of the lattice model 12 ranges from $6\lambda$, to $10\lambda$. Therefore, shortened microwave wavelength would result in reduced size of the whole diffraction system. The microwave frequency applied in the present invention may range from 30 GHz to 100 GHz, for example.

The microwave energy, in terms of scattering amplitude, reflected from the lattice model 12 should be controlled so that the microwave incident to the lattice model 12 may transmit through the whole lattice model 12. In one embodiment, the scattering amplitude of the microwave reflected from the lattice model would be $$\frac{N\lambda}{\pi D}|f| \leq 0.3,$$

where N represents the number of the cylinders 121; D represents the width of the lattice model 12; $\lambda$, represents the microwave wavelength; and f represents a scattering coefficient. This means, in the case of a planar wave having incident amplitude equal to 1, the scattering amplitude is the absolute value, of $H_0^{(1)}$ (Hankel functions) coefficient. In one embodiment, the number of the cylinders 121 ranges from 20 to 200.

In one embodiment, the cylinders 121 of the lattice model 12 are made of dielectric material. Therefore, even the height (H1) of the cylinders 121 is the same as the distance (H2) between the plates 11a and 11b, most of the microwave energy would not be reflected at the first row of the lattice plane in the lattice plane 12 because of the dielectric cylinders 121 and the unreflected microwave energy may transmit through the whole lattice model 12. In one embodiment, the pitch among the cylinders 121 of the lattice model 12 may range from $\lambda/2$ to $3\lambda$.

In one embodiment, the cylinders 121 of the lattice model 12 are made of metal. Since more reflection is caused by metal cylinders, the height (H1) of the metal cylinders would be lower than the distance (H2) between the plates 11a, 11b for microwave transmission through the whole lattice model 12. In the case of such configuration, some microwave energy may be reflected by the metal cylinders 121 for detection by the detector 14 and some microwave energy may transmit through the whole lattice model 12 via a gap between the cylinders 121 and the plate 11b. Preferably, the cylinder height H1 may be adjusted according to model analysis so that the amplitude of the microwave reflected from the lattice model 12 would meet the above-mentioned equation. In one embodiment, the pitch of the cylinders 121 of the lattice model 12 may range from $\lambda/2$ to $3\lambda$.

Figure 5:
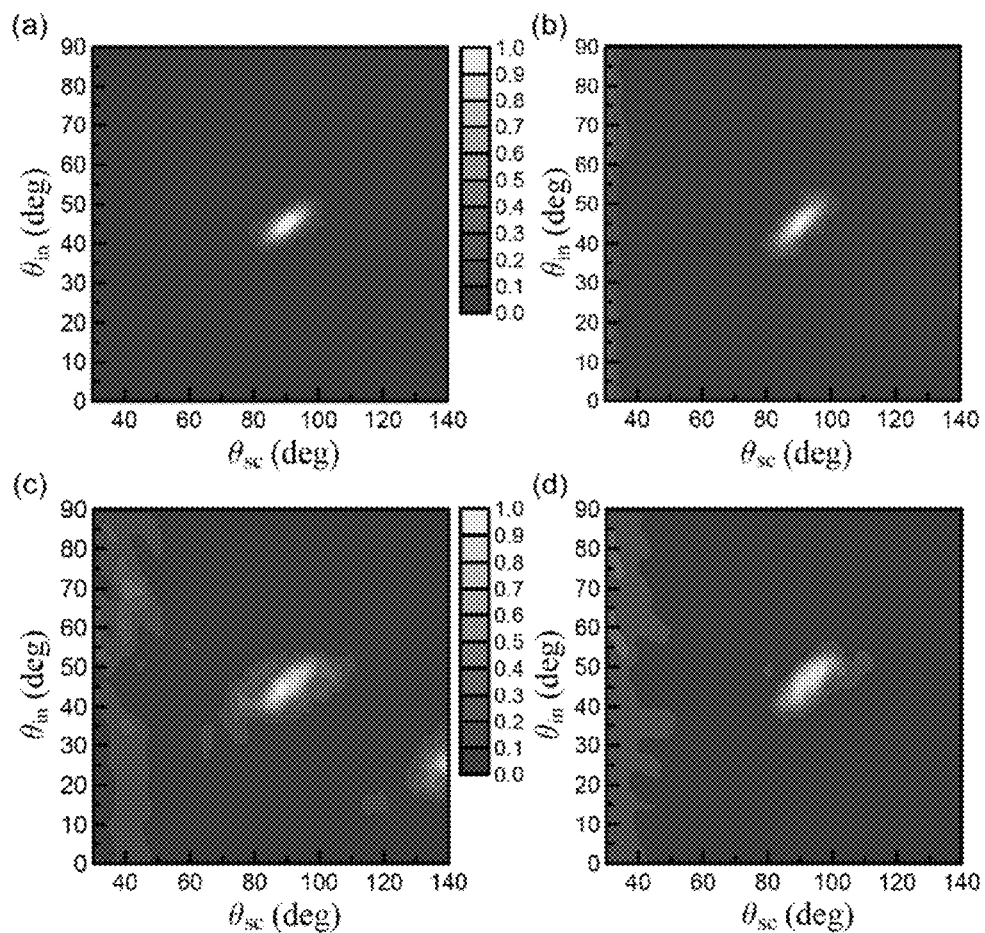
FIG. 5 and FIG. 6 are diagrams illustrating the correlation between incident angle $\theta_{in}$ and scattering angle $\theta_{sc}$ of microwave.
Figure 6:
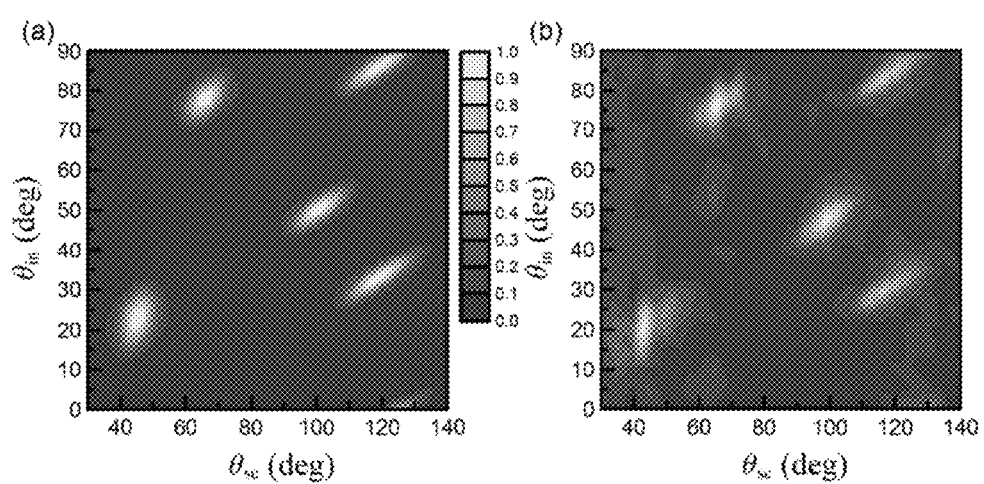

FIG. 5 and FIG. 6 illustrate the correlation between incident angle $\theta_{in}$ and scattering angle $\theta_{sc}$ of microwave, wherein FIG. 5(a) illustrates a theoretical value; FIG. 5(b) illustrates HFSS (High Frequency Structure Simulator by Ansoft) simulation; FIG. 5 (c) illustrates the experimental result of 10×10 array with 4 corners removed (N=76, as illustrated in FIG. 3a) and composed of dielectric cylinders, where the diameter is 0.4 mm, the height is 1.0 mm, the pitch is 2.25 mm ($\lambda/\sqrt{2}$) and the microwave frequency is 94 GHz (the same parameter is applied in the following); FIG. 5 (d) illustrates the array illustrated in FIG. 3a, where the cylinders are metal, the diameter is 0.4 mm, the height is 0.2 mm, the pitch is 2.25 mm; FIG. 6(a) illustrates the theoretic value; and FIG. 6(b) illustrates the experimental result of a 5×5 array composed of metal cylinders, where the diameter is 0.6 mm, the height is 0.3 mm and the pitch is 4.15 mm ($1.3\lambda$). The experimental result obtained by the microwave diffraction system is very similar to the theoretical value with negligible deviation according to FIG. 5 and FIG. 6.

To sum up, the microwave diffraction system of the present invention may constrain microwave energy within the planar waveguide so as to present the diffraction phenomenon in a 2-dimensional manner. The diffraction pattern obtained by the microwave diffraction system of the present invention is similar to the theoretical value by using custom-designed lattice model, e.g. dielectric cylinders or shorter metal cylinders. In addition, the size of the whole diffraction system can be greatly reduced, for example, to about 30×30 cm by adopting microwave with shorter wavelength.

While the invention can be subject to various modifications and alternative forms, a specific example thereof has been shown in the drawings and is herein described in detail. It should be understood, however, that the invention is not to be limited to the particular form disclosed, but on the contrary, the invention is to cover all modifications, equivalents, and alternatives falling within the spirit and scope of the appended claims.

What is claimed is:

1. A microwave diffraction system to simulate Bragg diffraction, comprising:

two circular electrically conductive plates configured in a parallel manner on a common center to form a planar waveguide;

a lattice model including a plurality of cylinders arranged in a regular order and placed between the two plates, the placement of the lattice model being concentric with the two circular electrically conductive plates;

a transmitter arranged at an outside edge of the planar waveguide and configured for transmitting a microwave or millimeter wave signal towards the lattice model; and a detector arranged at the outside edge of the planar waveguide and configured for detecting the microwave or millimeter wave signal reflected from the lattice model, wherein the detector may be rotated around the diameter of the parallel plate waveguide.

2. The microwave diffraction system as claimed in claim 1, wherein an electric field of the microwave is orthogonal to the plates.

3. The microwave diffraction system as claimed in claim 1, wherein the microwave is TEM mode wave.

4. The microwave diffraction system as claimed in claim 1, wherein the radius of the cylinders is less than or equal to $\lambda/2\pi$, where $\lambda$ represents the wavelength of the microwave.

5. The microwave diffraction system as claimed in claim 1, wherein the pitch among the cylinders of the lattice model ranges from $\lambda/2$ to $3\lambda$, where $\lambda$, represents the wavelength of the microwave.

6. The microwave diffraction system as claimed in claim 1, wherein a scattering amplitude of the microwave reflected from the lattice model is:

$$\frac{N\lambda}{\pi D}|f| \leq 0.3,$$

where N represents the number of the cylinders; D represents the width of the lattice model; $\lambda$ represents the microwave wavelength; and f represents a scattering coefficient.

7. The microwave diffraction system as claimed in claim 1, wherein the number of cylinders ranges from 20 to 200.

8. The microwave diffraction system as claimed in claim 1, wherein the width of the lattice model ranges from $6\lambda$ to $10\lambda$, where $\lambda$ represents the wavelength of the microwave.

9. The microwave diffraction system as claimed in claim 1, wherein the cylinders are made of dielectric material.

10. The microwave diffraction system as claimed in claim 1, wherein the cylinders are made of metal.

11. The microwave diffraction system as claimed in claim 10, wherein the height of the cylinders is lower than the distance between the plates.

12. The microwave diffraction system as claimed in claim 1, wherein the distance between the detector and the lattice model is $D^2/2\lambda$, wherein D represents the width of the lattice model, and $\lambda$ represents the wavelength of the microwave.

13. The microwave diffraction system as claimed in claim 1, wherein the transmitter comprises a first mode converter arranged between the plates and connected to the transmitter with its one end, wherein the connecting end of the first mode converter has a smaller inner radius than that of its opening end.

14. The microwave diffraction system as claimed in claim 1, wherein the detector comprises a second mode converter arranged between the plates and connected to the detector with its one end, wherein the connecting end of the second mode converter has a smaller inner radius than that of its opening end.

15. The microwave diffraction system as claimed in claim 1, further comprising a rotor connected to the detector whereby the detector may be rotated along the lattice model.

16. The microwave diffraction system as claimed in claim 1, further comprising a carrier configured for carrying the lattice model, wherein at least one of the plates has an opening and the cylinders of the lattice model protrude from the planar waveguide through the opening.

17. The microwave diffraction system as claimed in claim 16, wherein the transmitter is connected to the plate having the opening and the carrier may be rotated against the plate having the opening.

18. The microwave diffraction system as claimed in claim 1, wherein the frequency of the microwave ranges from 30 GHz to 100 GHz.

19. The microwave diffraction system as claimed in claim 1, wherein the frequency of the microwave is 94 GHz.

* * * * *